Feb. 10, 1970  D. SCIAKY  3,495,067
RESISTANCE WELDING MACHINE
Filed Sept. 1, 1965  5 Sheets-Sheet 1

INVENTOR.
David Sciaky

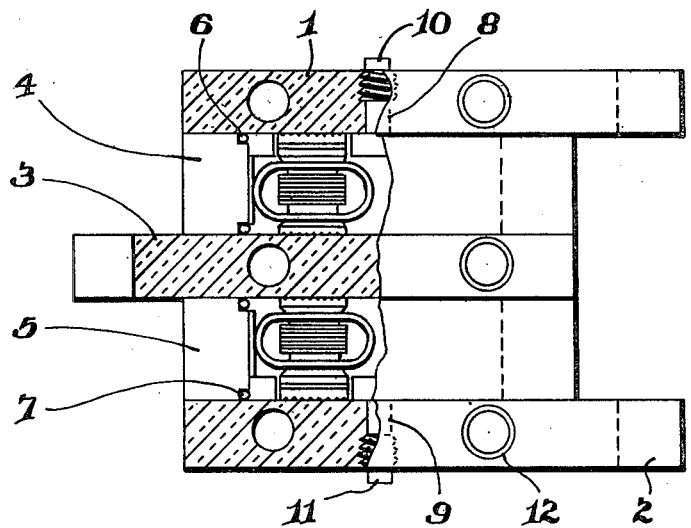
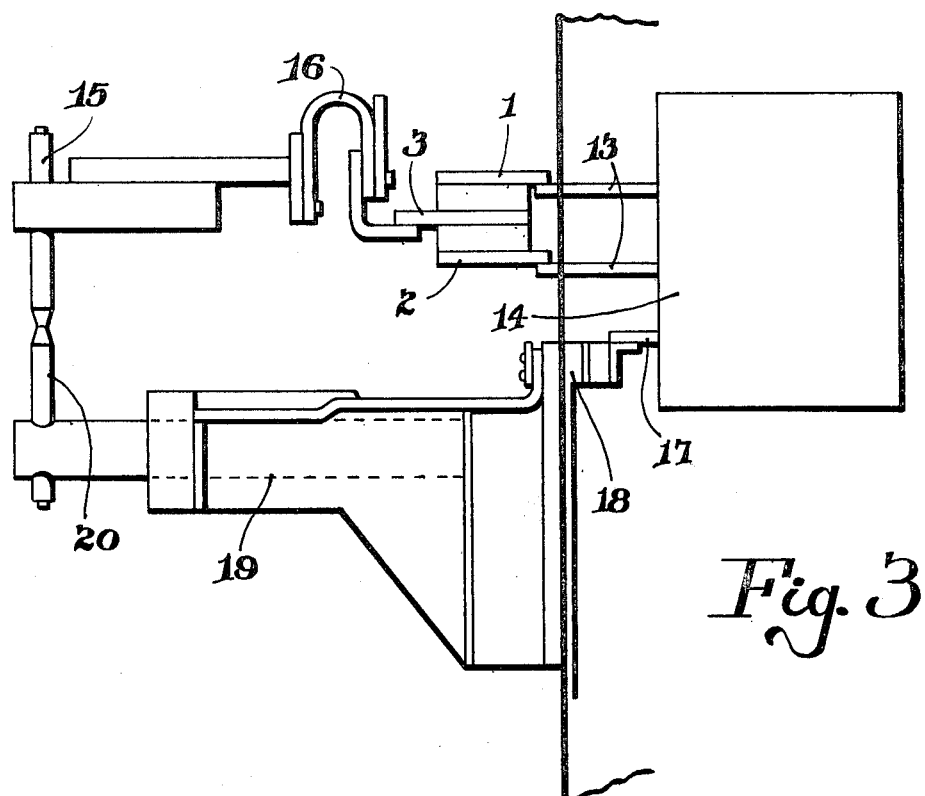

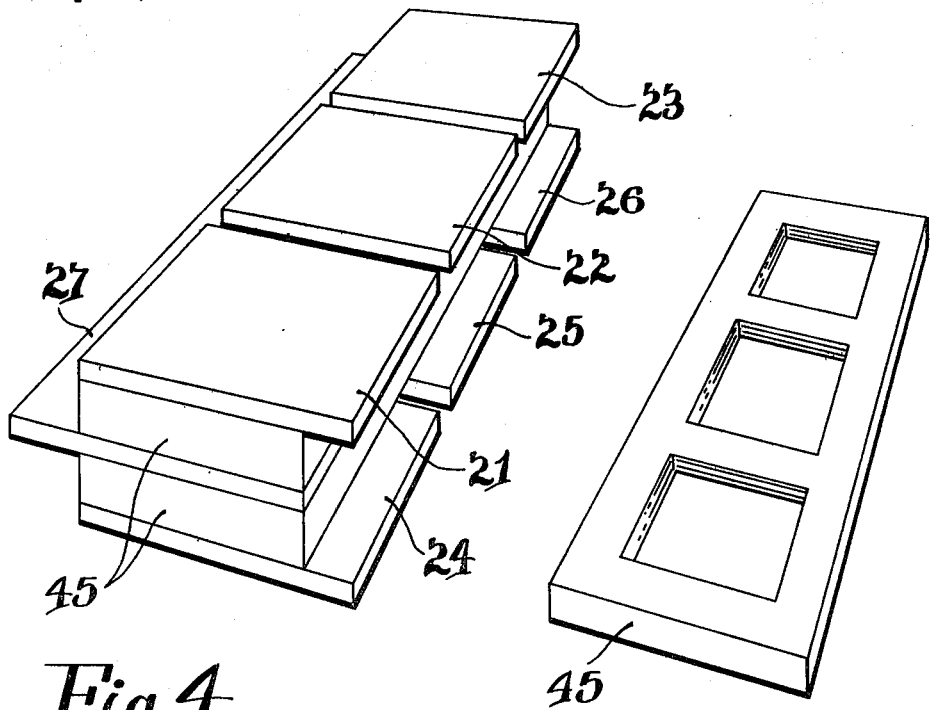
Fig. 4
Fig. 4a
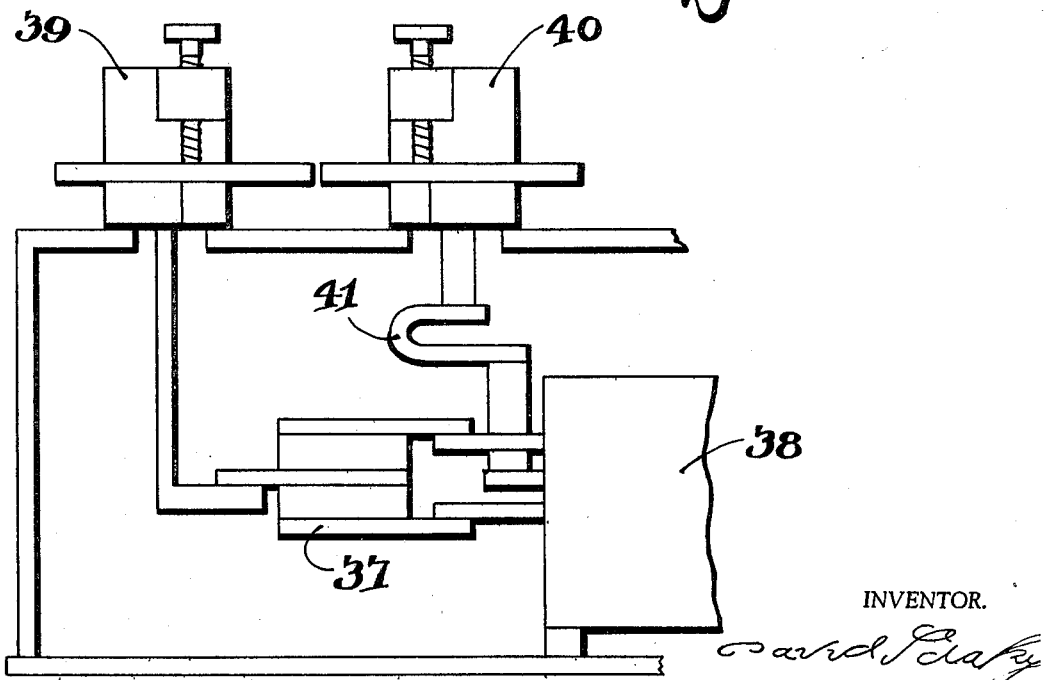
Fig. 8

INVENTOR
DAVID SCIAKY

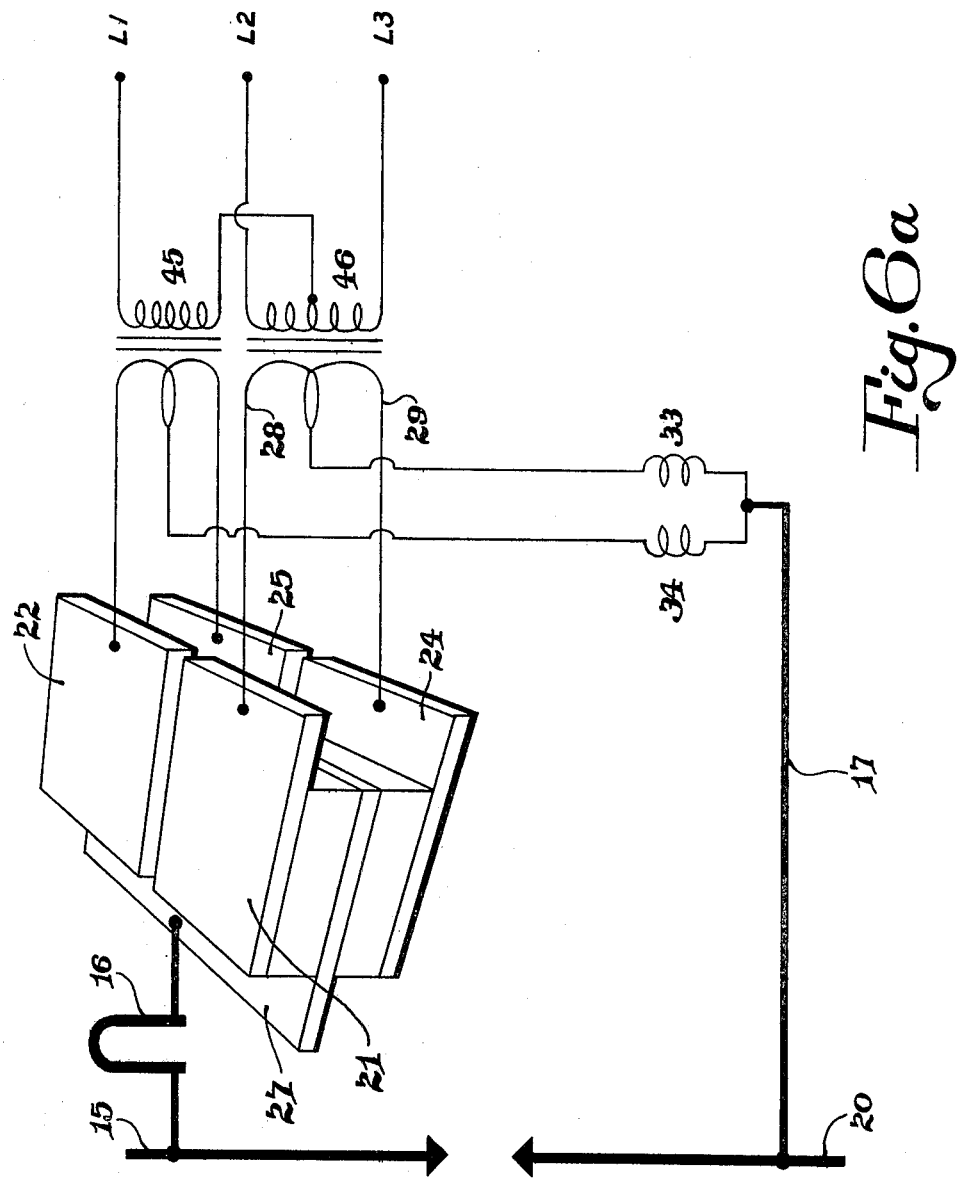

United States Patent Office 3,495,067
Patented Feb. 10, 1970

3,495,067
RESISTANCE WELDING MACHINE
David Sciaky, 4915 W. 67th St., Chicago, Ill. 60638
Filed Sept. 1, 1965, Ser. No. 484,383
Int. Cl. B23k *11/24*
U.S. Cl. 219—116                                    10 Claims

ABSTRACT OF THE DISCLOSURE

This invention relates to resistance welding machines, and specifically to the combination of means, for producing a unidirectional and continuous flow of current through the work pieces being welded and the electrodes of the resistance welding machine during the period required to produce a weld. The combination includes a full wave, cooled, semi-conductor type, diode assembly of high current carrying capacity but small size which is arranged to rectify the high secondary currents required for resistance welding. The combination allows for single phase or polyphase, half-wave or full-wave, rectification of the current in the secondary circuit of the welding machine. Means are provided for adjusting the inductance of the current carrying conductors in the secondary circuit so as to affect the commutation of current from one phase to the next in the primary.

---

Diodes of the semiconductor type have been widely used in recent years for the rectification of alternating current. Large rectifying units, particularly with silicon diodes, have been built for high continuous currents in the order of 10,000 amperes and more.

Such rectifying equipment is desirable in conjunction with resistance welding machines as a means of obtaining in the secondary circuit of the welding transformer direct instead of alternating welding current so as to reduce the power demand by the elimination of reactive effect in the throat of the machine when using three phase rectification. The load is moreover uniformly distributed over the three phases of the supply.

These machines, however, have the great inconvenience that the rectifying means connected to the secondaries of the transformers are bulky. As a consequence their connections with the arms of the machine are of great length. This results in high power losses, due to the fact that the secondary welding current is inherently very high, often in the order of 10,000 to 100,000 amperes or more.

The bulkiness of the rectifying means is due to the fact that the diodes have individually a relatively low current conducting capacity and consequently a very large number of such diodes is required.

Connecting these diodes in groups in a way that the load is evenly distributed on every diode and the heat losses within the diodes and their connections are effectively removed is a difficult task and increases exceedingly the cost of the equipment.

In the co-pending application entitled "Arrangement of the Diode as a Single Unit and in a Group," now patent No. 3,412,294 a novel diode assembly and a multiple diode structure have been disclosed which offer among other novel features the advantage of great compactness and very high current carrying capacity.

The object of the present invention is to produce by means of the diodes and structures disclosed in the aforementioned invention:

A structure for the full wave rectification of single phase alternating current, particularly of high magnitude;

An arrangement in a resistance welding machine by which a full wave rectifying the structure can be inserted directly in the throat of the machine;

An arrangement by which (the secondary ends) the terminals of the secondary winding of the welding transformers can be directly connected to the rectifying structure without the use of intermediate conductors;

An arrangement by which the rectifying structures can be easily replaced in the event of failure;

An arrangement by which reactors can be provided within the secondary circuit to insure correct commutation of the current from the phases of the polyphase power supply; and An arrangement by which several rectifying structures can be assembled in parallel within a limited space so as to increase the current carrying capacity of the machine.

In FIG. 1 is reproduced for the purpose of clarity the structure shown in FIG. 7 of the aforementioned co-pending application. This structure rectifies only one polarity of alternating current.

FIG. 2 shows a structure according to the invention in which parts of the structure shown in FIG. 1 are combined into a compact structure for full wave rectification.

FIG. 3 shows the throat of a spot welding machine into whose upper conductor has been inserted the structure of FIG. 2.

FIG. 4 shows a 3-phase full wave rectifying structure using the elements of FIG. 1.

FIG. 4A shows the insulating frame into which the three groups of diodes used in the structure of FIG. 4 are nested.

FIGS. 6 and 6A show another arrangement of a machine powered by a 3-phase supply.

FIG. 7 shows a portable single phase resistance welding transformer whose secondary terminals are provided with a full wave rectifying structure FIG. 2.

FIG. 8 shows a combination of a full wave rectifying structure as per FIG. 2 with a single phase flash butt welding machine.

Figure 1:
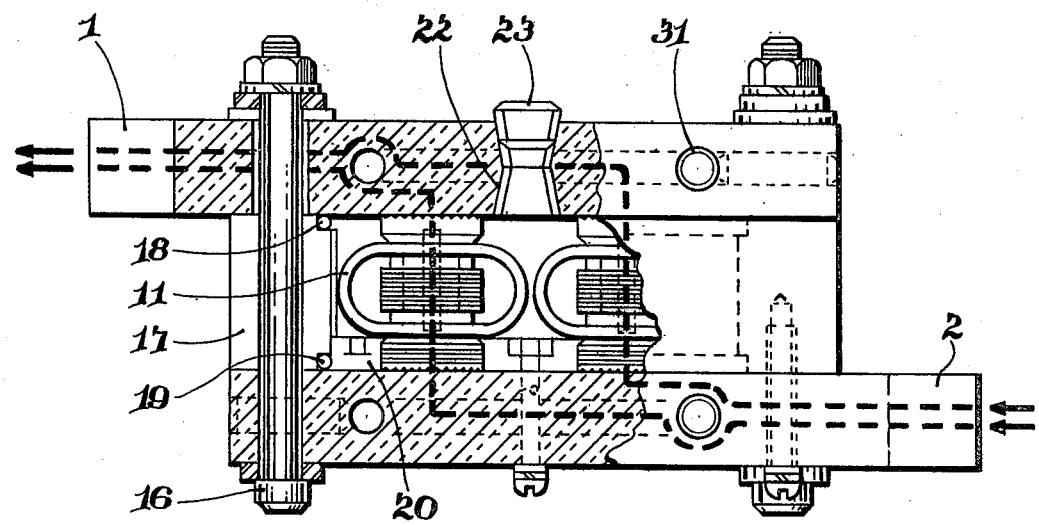

In FIG. 2 one or more diode assemblies are contained in two chambers formed by the external conducting plates 1 and 2 and the internal plate 3. The polarity of the diodes of the upper chamber is opposite to those of the lower chamber so that the positive and negative half waves of an alternating current flow from conducting plates 1 and 2 respectively through the corresponding diodes to the internal conducting plate 3. These three plates are insulated from each other by spacers 4 and 5 which surround the two chambers and seal them against the atmosphere by means of the O-ring seals 6 and 7. The two chambers are filled with a thermally conducting and protective medium which is introduced through the ports 8 and 9 closed by plugs 10 and 11. The conducting plates 1, 2, and 3 are provided with channels 12 through which a cooling fluid, for example water, is circulated. These channels allow an effective removal of the heat from every one of the diode assemblies, particularly from the internal conductor plate 3, so that the highest possible electrical current can be passed without causing a detrimental temperature rise in the diodes or any other components.

The full wave rectifying structure of FIG. 2 is shown in FIG. 3 with its conducting plates 1 and 2 directly connected to the secondary ends 13 of the welding transformer 14. The internal conductor 3 is connected to the upper welding electrode 15 by conventional means of a flexible conductor 16 which allows the free up and down movement of the electrode 15.

The opposite terminals of the transformer secondaries (not shown) are connected together at the center tap through the conductor 17 with the face plate 18 of the machine and by conventional means through the lower arm 19 to the lower electrode 20.

It can be seen from the figures that the full wave rectifying structure, because of its compactness, does not encumber the throat of the machine. It also can be seen that by loosening a few bolts the rectifying structure can be removed and quickly replaced by a spare unit in case of failure. No increase in length of the secondary circuit results from the use of this rectifying structure, consequently no additional power losses are incurred.

The structure of FIG. 4 is similar to the one of FIG. 2. Here, however, the three alternating currents of a 3-phase system have to be rectified and, consequently, six groups of one or more diode assemblies are contained in six chambers (not shown) formed by the six external conducting plates 21, 22, 23, 24, 25, 26 and a single internal conducting plate 27.

The polarity of the diodes in the upper chambers is opposite to that of the lower chambers so that the positive and negative half waves of the three alternating currents flow in phase relationship from the six conducting plates respectively through the corresponding diodes to the internal conducting plate 27.

On both sides of the internal conducting plate 27 is provided an insulating frame 45 shown in FIG. 4A with three openings in combination with the outer conducting plates forming the six chambers which house the diode assemblies. Known means can be used for holding the assembly together.

Figure 5:
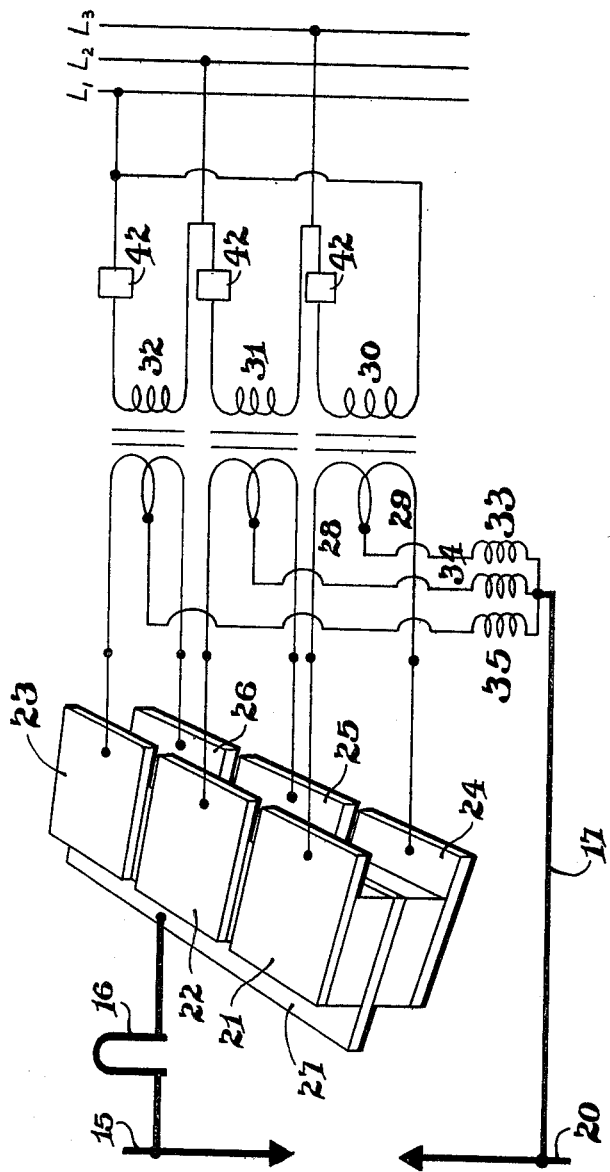
FIG. 5 shows schematically the secondary circuit of a 3-phase spot welding machine using the rectifying structure of FIG. 4.

As shown schematically in FIG. 5, the ends of the conducting plates 21 and 24 are directly connected to the secondary ends 28 and 29 of a single phase transformer 30. The ends of conducting plates 22 and 25 are directly connected to the secondary ends of single phase transformer 31 and, likewise, the ends of conducting plates 23 and 26 to transformer 32.

The internal conducting plate 27 is connected to the upper welding electrode 15 by the conventional means of a flexible conductor 16 which allows the free up and down movement of electrode 15.

The center taps of the secondaries of transformers 30, 31, 32 are each provided with reactive means 33, 34, 35 and connected together through the conductor 17 to the lower electrode 20.

The primary windings of the three single phase transformers are connected in delta and receive the power from the 3-phase supply through contactors. The compactness of the 3-phase full wave rectifying structure of FIG. 4 as used in FIG. 5 results in a simple, economical and power saving welding machine.

Of course, instead of the three single phase transformers of FIG. 5, a single 3-phase transformer may be used. The arrangement can, of course, be used for various purposes other than welding wherever 3-phase power has to be rectified into DC current of high magnitude as, for example, for electroplating or melting purposes.

Figures 6, 7:
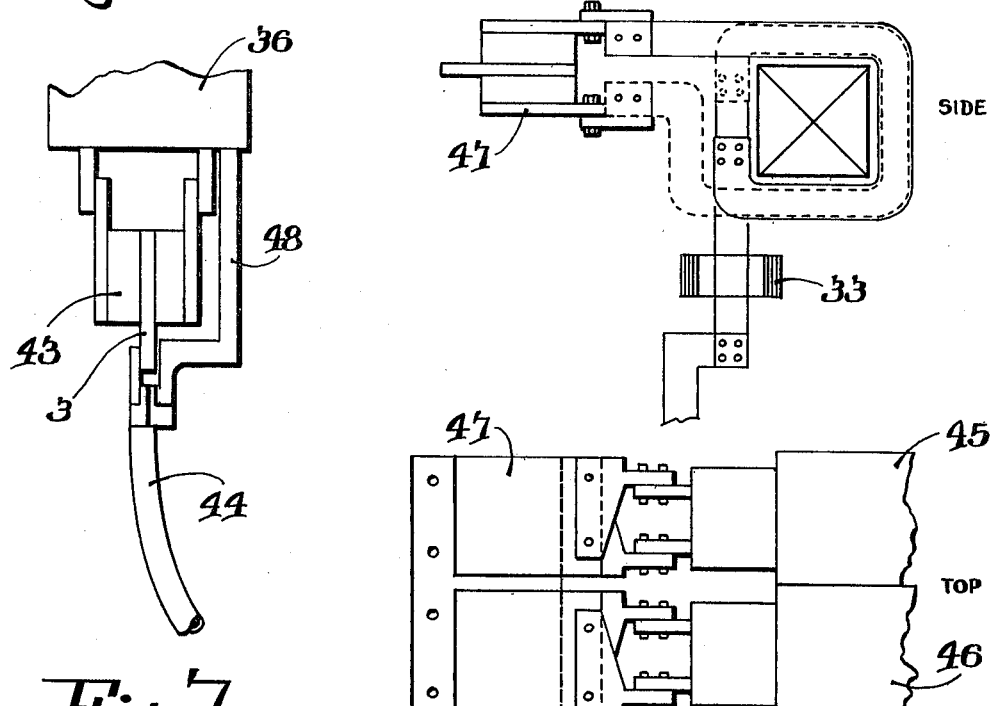

The machine of FIG. 6 includes two transformers 45 and 46 whose primaries are Scott connected and whose secondaries are connected to a rectifying structure 49 similar to that shown on FIG. 4.

The part 33 is a magnetic circuit of iron laminations or other suitable magnetic material which encircles the conductor locally and increases the inductance of the conductor in this region.

This arrangement has the advantage of simplifying the secondary network and of reducing the cost of the equipment.

FIG. 6A is a schematic drawing showing the connections between the 3-phase power supply, the two Scott connected transformers, the diode assemblies and the secondary circuit of the welding machine.

In the combination FIG. 7 of a portable single phase welding transformer 36 with a full wave rectifying structure 43, the two concentric conductors of relatively heavy section of a conventional flexible cable 44 are connected respectively to the internal conducting plate of the rectifying structure and to the center tap 48 of the secondary windings.

A spotwelding gun (not shown) is connected to the other end of the cable. Whereas in the conventional single phase portable equipment the flow of high alternating welding current causes an undesirable vibration of the cable which lessens its life and fatigues the operator, the new arrangement eliminates the vibration and substantially prolongs the life of the cable.

In the flash butt welder schematically shown on FIG. 8 a single phase full wave rectifying structrue 37 as per FIG. 2 is connected with its two external conducting plates to the secondary ends of welding transformer 38 and with its internal conducting plate to the lefthand platen 39 of the machine. The center tap of the transformer secondary is connected to the movable righthand platen 40 by means of a conventional flexible conductor 41 which allows the free motion of the righthand platen for the flashing and upsetting operation.

It is known that flash butt welders require, for the performance of a satisfactory welding operation, a low impedance, i.e., low reactance secondary circuit. On the other hand the power demand from the supply line during upsetting of the welded joint is usually high when the cross section of the workpiece is large or when the material to be welded is a good electrical conductor, as for example copper or aluminum.

The attainment of a low reactance secondary circuit is often difficult owing to the physical dimensions of the workpiece, the platens and the large stroke sometimes necessary for the movable platen. Consequently the flashing operation is not always satisfactory and, in order to compensate for the high inductive voltage drop, a relatively high secondary electromotive force has to be provided. The resulting power demand from the supply line is often excessive.

In this butt welder arrangement the use of a rectified current eliminates the necessity of a low reacting secondary circuit, simplifies the design of latter and reduces substantially the line power demand.

In the present description only a few examples have been cited among many other applications which fall within the scope of the invention.

From the foregoing, it is believed that the objects, advantages, construction and utility of my present invention will be readily comprehended by persons skilled in the art, without further description. Although the invention has been herein shown and described in a simple and practicable form, it is recognized that certain parts or elements herein are representative of other parts or elements that may be used in substantially the same manner to accomplish substantially the same results. Therefore, it is to be understood that the invention is not to be limited to the exact details described herein, but is to be accorded the full scope and protection of the appended claims.

Having described my invention, what is claimed as novel is:

1. In a resistance welder having a frame, a pair of welding electrodes and multiplicity of transformers mounted within said frame, each having primary windings for connection to a polyphase power supply and center-tapped secondary windings, having terminals at start and end of each winding; the improvement comprising a diode assembly for each of said secondary windings each diode assembly arranged with alternating current terminals and direct current terminals respectively at opposite ends of each diode assembly, said alternating current terminals connected directly to and supported by the start and end terminals of a respective secondary winding, the said direct current terminals connected to one of the aforesaid welding electrodes, and the second of said pair of electrodes connected by current conductors to the center tap of each secondary winding so that direct current may pass from one electrode, through the work to be welded and through the second electrode.

2. An apparatus as in claim 1 in which two transformers powered from a three phase supply line are arranged in a Scott connection and in which two full wave diode structures are connected.

3. An apparatus as in claim 1, in which iron laminations surround each of the conductors connected between the center tapped windings and the second electrode.

4. An apparatus as in claim 1 in which one transformer and one diode assembly is mounted so as to operate from a single phase power supply line.

5. An apparatus as in claim 1 in which the welding machine is of the butt welder type.

6. An apparatus as in claim 1 in which the D.C. terminal of the several diode assemblies is a single common conducting plate.

7. An apparatus as in claim 1 in which the diode assemblies comprise a single inner conductor plate separating two chambers each containing a multiplicity of diodes in parallel relationship, one chamber having diodes arranged in opposite polarity to the diodes in the second chamber with respect to the aforementioned inner conductor plate, the outer walls of the chambers being constituted by conductors insulated from each other and the internal plate and arranged so that they may be connected directly to the transformer secondary terminals of the respective phases of the polyphase power supply.

8. An apparatus as in claim 7 characterized in that the chambers containing the diodes are filled with a thermally conductive fluid capable of protecting them from contamination by the atmosphere and having non-conductive electrical dielectric properties.

9. An apparatus as in claim 7 in which the diode assemblies include means for circulating the cooling fluid through the conductor plates.

10. In an electric resistance welding machine of the portable type, a welding transformer having primary and secondary windings, said secondary windings having terminals at the start and end of the winding and a center tap and a full wave diode rectifier assembly having direct current and alternating current terminals, said alternating current terminals mounted upon and connected to said secondary terminals, a flexible cable capable of carrying the secondary current having two terminals, one of which connects directly to the D.C. terminal of the diode assembly, the second of which connects to the aforesaid center top of the secondary winding, and a portable welding gun connected in series with said secondary circuit by means of said flexible cable.

References Cited

UNITED STATES PATENTS

| 2,221,576 | 11/1940 | Dawson | 219—108 |
| 2,602,152 | 7/1952 | Storsand | 321—5 XR |
| 3,102,976 | 9/1963 | Blair | 219—108 XR |
| 3,113,259 | 12/1963 | Walker | 321—24 |
| 3,339,107 | 8/1967 | Aldenhoff | 321—26 |
| 3,412,294 | 11/1968 | Sciaky | 317—234 |

JOSEPH V. TRUHE, Primary Examiner

L. H. BENDERA, Assistant Examiner

U.S. Cl. X.R.

219—108